US006591347B2

(12) United States Patent
Tischler et al.

(10) Patent No.: US 6,591,347 B2
(45) Date of Patent: *Jul. 8, 2003

(54) DYNAMIC REPLACEMENT TECHNIQUE IN A SHARED CACHE

(75) Inventors: Brett A. Tischler, Longmont, CO (US); Rajeev Jayavant, Ft. Collins, CO (US)

(73) Assignee: National Semiconductor Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/169,312

(22) Filed: Oct. 9, 1998

(65) Prior Publication Data

US 2001/0049771 A1 Dec. 6, 2001

(51) Int. Cl.[7] ................................................ G06F 12/08
(52) U.S. Cl. ..................... 711/134; 711/135; 711/136; 711/128
(58) Field of Search ................................ 711/133, 134, 711/118, 123, 128, 130, 135, 129, 136; 345/521, 501, 502, 503, 504

(56) References Cited

U.S. PATENT DOCUMENTS

| 5,386,538 A | * | 1/1995 | Nye | 711/3 |
|---|---|---|---|---|
| 5,467,459 A | * | 11/1995 | Alexander et al. | 395/480 |
| 5,627,994 A | * | 5/1997 | Levy et al. | 711/150 |
| 5,680,573 A | * | 10/1997 | Rubin et al. | 711/129 |
| 5,717,893 A | * | 2/1998 | Mattson | 711/129 |
| 5,905,509 A | * | 5/1999 | Jones et al. | 345/520 |
| 5,990,914 A | * | 11/1999 | Horan et al. | 345/521 |
| 6,044,478 A | * | 3/2000 | Green | 714/42 |
| 6,047,358 A | * | 4/2000 | Jacobs | 711/133 |
| 6,078,338 A | * | 6/2000 | Horan et al. | 345/521 |
| 6,094,203 A | * | 7/2000 | Desormeaux | 345/501 |
| 6,163,835 A | * | 12/2000 | Todd et al. | 712/34 |
| 6,260,114 B1 | * | 7/2001 | Schug | 711/129 |
| 6,272,598 B1 | * | 8/2001 | Arlitt et al. | 709/203 |
| 6,282,617 B1 | * | 8/2001 | Tirumala et al. | 711/133 |

* cited by examiner

*Primary Examiner*—Matthew Kim
*Assistant Examiner*—Pierre-Michele Bataille
(74) *Attorney, Agent, or Firm*—Davis Munck, P.C.

(57) ABSTRACT

A dynamically configurable replacement technique in a unified or shared cache reduces domination by a particular functional unit or an application such as unified instruction/data caching by limiting the eviction ability to selected cache regions based on over utilization of the cache by a particular functional unit or application. A specific application includes a highly integrated multimedia processor employing a tightly coupled shared cache between central processing and graphics units wherein the eviction ability of the graphics unit is limited to selected cache regions when the graphics unit over utilizes the cache. Dynamic configurability can take the form of a programmable register that enables either one of a plurality of replacement modes based on captured statistics such as measurement of cache misses by a particular functional unit or application.

34 Claims, 4 Drawing Sheets

DYNAMIC REPLACEMENT TECHNIQUE IN A SHARED CACHE

CROSS REFERENCE TO RELATED APPLICATIONS

This application is related to commonly assigned and co-pending U.S. patent applications Ser. No. 09/169,314 entitled "Multimedia Processor Employing A Shared CPU-Graphics Cache" and Ser. No. 09/169,347 entitled "Hierarchical Texture Cache," contemporaneously filed herewith and all herein incorporated by reference.

BACKGROUND OF THE INVENTION

1. Field of the Invention

The invention relates generally to a unified or shared cache and more specifically to a dynamically configurable replacement technique to reduce domination by a particular functional unit or an application (e.g. caching instructions or data) by limiting the eviction ability to selected cache regions based on over and/or under utilization of the cache by the particular functional unit or application.

2. Description of Related Art

The following background information is provided to aid in the understanding of the application of the present invention and is not meant to be limiting to the specific examples set forth herein. Displaying 3D graphics is typically characterized by a pipelined process having tessellation, geometry and rendering stages. The tessellation stage is responsible for decomposing an object into geometric primitives (e.g. polygons) for simplified processing while the geometry stage is responsible for transforming (e.g. translating, rotating and projecting) the tessellated object. The rendering stage rasterizes the polygons into pixels and applies visual effects such as, but not limited to, texture mapping, MIP mapping, Z buffering, depth cueing, anti-aliasing and fogging.

The entire 3D graphics pipeline can be embodied in software running on a general purpose CPU core (i.e. integer and floating point units), albeit unacceptably slow. To accelerate performance, the stages of the graphics pipeline are typically shared between the CPU and a dedicated hardware graphics controller (a.k.a. graphics accelerator). The floating-point unit of the CPU typically handles the vector and matrix processing of the tessellation and geometry stages while the graphics controller generally handles the pixel processing of the rendering stage.

Reference is now made to FIG. 1 that depicts a first prior art system of handling 3D graphics display in a computer. Vertex information stored on disk drive 100 is read over a local bus (e.g. the PCI bus) under control by chipset 102 into system memory 104. The vertex information is then read from system memory 104 under control of chipset 102 into the L2 cache 108 and L1 cache 105 of CPU 106. The CPU 106 performs geometry/lighting operations on the vertex information before caching the results along with texture coordinates back into the L1 cache 105, the L2 cache 108 and ultimately back to system memory 104. A direct memory access (DMA) is performed to transfer the geometry/lighting results, texture coordinates and texture maps stored in system memory 104 over the PCI bus into local graphics memory 112 of the graphics controller 110 for use in rendering a frame on the display 114. In addition to storing textures for use with the graphics controller 110, local graphics memory 112 also holds the frame buffer, the z-buffer and commands for the graphics controller 110.

A drawback with this approach is inefficient use of memory resources since redundant copies of texture maps are maintained in both system memory 104 and the local graphics memory 112. Another drawback with this approach is the local graphics memory 112 is dedicated to the graphics controller 110, is more expensive than generalized system memory and is not available for general-purpose use by the CPU 106. Yet another drawback with this approach is the attendant bus contention and relatively low bandwidth associated with the shared PCI bus. Efforts have been made to ameliorate these limitations by designating a "swap area" in local graphics memory 112 (sometimes misdescriptively referred to as an off chip L2 cache) so that textures can be prefetched into local graphics memory 112 from system memory 104 before they are needed by the graphics controller 110 and swapped with less recently used textures residing in the texture cache of the graphics controller 110. The local graphics memory swap area merely holds textures local to the graphics card (to avoid bus transfers) and does not truly back the texture cache as would a second level in a multi-level texture cache. This approach leads to the problem, among others, of deciding how to divide the local graphics memory 112 into texture storage and swap area. Still yet another drawback with this approach is the single level texture cache in prior art graphics controllers consume large amounts of die area since the texture cache must be multi-ported and be of sufficient size to avoid performance issues.

Reference is now made to FIG. 2 that depicts an improved but not entirely satisfactory prior art system of handling 3D graphics display in a computer. The processor 120, such as the Pentium II™ processor from Intel corporation of Santa Clara Calif., comprises a CPU 106 coupled to an integrated L2 cache 108 over a so-called "backside" bus 126 that operates independently from the host or so-called "frontside" bus 128. The system depicted in FIG. 2 additionally differs from that in FIG. 1 in that the graphics controller 110 is coupled over a dedicated and faster AGP bus 130 through chipset 102 to system memory 104. The dedicated and faster AGP bus 130 permits the graphics controller 110 to directly use texture maps in system memory 104 during the rendering stage rather than first pre-fetching the textures to local graphics memory 112.

Although sourcing texture maps directly out of system memory 104 mitigates local graphics memory constraints, some amount of local graphics memory 112 is still required for screen refresh, Z-buffering and front and back buffering since the AGP bus 130 cannot support such bandwidth requirements. Consequently, the system of FIG. 2 suffers from the same drawbacks as the system of FIG. 1, albeit to a lesser degree. Moreover, there is no way for the graphics controller 110 to directly access the L2 cache 108 that is encapsulated within the processor 120 and connected to the CPU 106 over the backside bus 126.

From the foregoing it can be seen that memory components, bus protocols and die size are the ultimate bottleneck for presenting 3D graphics. Accordingly, there is a need for a highly integrated multimedia processor having tightly coupled central processing and graphical functional units that share a relatively large cache to avoid slow system memory access and the requirement to maintain separate and redundant local graphics memory. Moreover, there is a need to avoid polluting the shared cache resulting from storing a significant quantity of graphics data in the shared cache to a point that a significant amount of non-graphics data needed by the central processing unit is evicted from the shared cache such that the performance of the central processing unit is effected.

SUMMARY OF THE INVENTION

To overcome the limitations of the prior art described above, and to overcome other limitations that will become apparent upon reading and understanding the present specification, the present invention discloses a dynamically configurable cache replacement technique in a shared or unified cache to reduce domination by a particular functional unit or an application such as unified instruction/data caching by limiting the eviction ability to selected cache regions based on over and/or under utilization of the cache by the particular functional unit or application. A specific application of the present invention includes a highly integrated multimedia processor employing a tightly coupled shared cache between central processing and graphics units wherein the eviction ability of the graphics unit is limited to selected cache regions when the graphics unit over utilizes the cache. Dynamic configurability can take the form of a programmable register that enables either one of a plurality of replacement modes based on captured statistics such as measurement of cache misses and/or hits by a particular functional unit or application.

A feature of the present invention is providing the graphics unit access to data generated by the central processing unit before the data is written-back or written-through to system memory without significantly polluting the shared cache.

Another feature of the present invention is reduction of the system memory bandwidth required by the central processing and graphics units.

Another feature of the present invention is pushing data transfer bottlenecks needed for 3D graphics display into system memory such that system performance will scale as more advanced memories become available.

These and various other objects, features, and advantages of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a specific example of a dynamic replacement technique in a shared cache in accordance with the principles of the present invention.

DESCRIPTION OF THE PREFERRED EMBODIMENT

Figure 1:
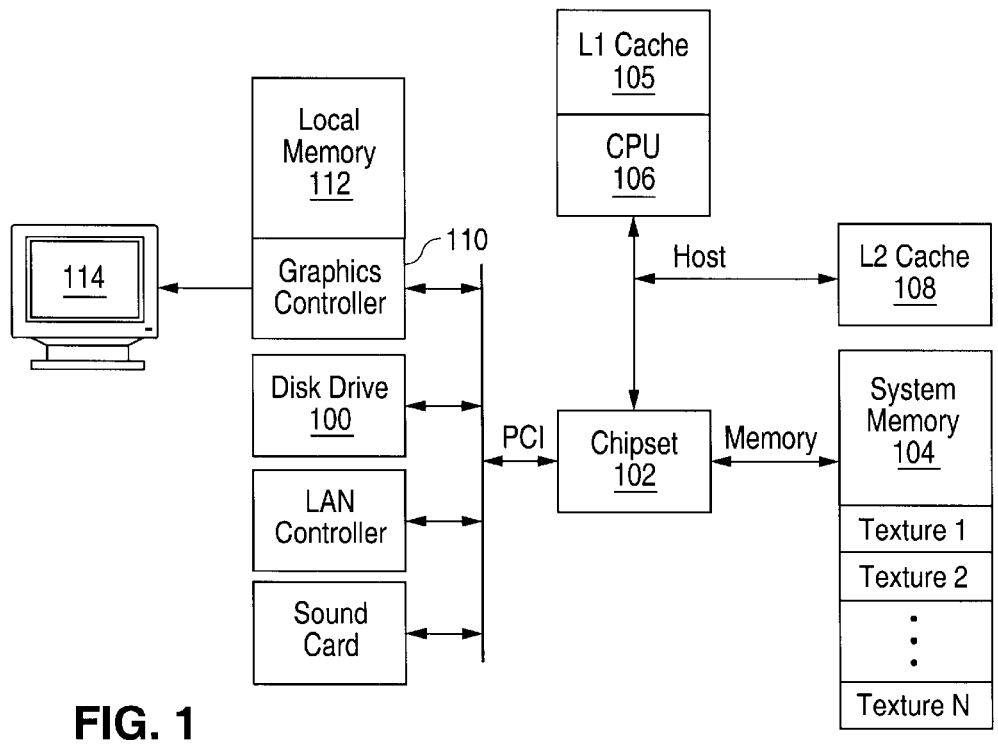
FIG. 1 is a first prior art system block diagram of handling 3D graphics display in a computer.
Figure 2:
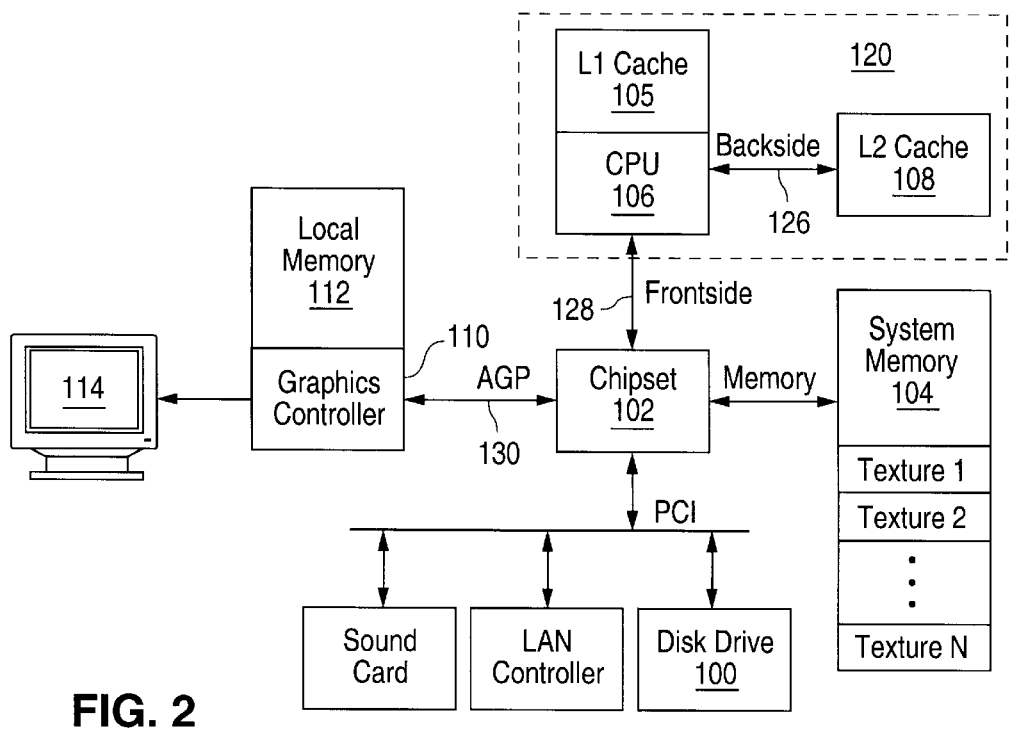
FIG. 2 is a second prior art system block diagram of handling 3D graphics display in a computer.

The detailed description of the preferred embodiment for the present invention is organized as follows:

1.0 Exemplary System
2.0 Exemplary Central Processing Unit
3.0 Exemplary Graphics Unit
   3.1 Hierarchical Texture Cache
4.0 Shared L2 Cache Organization
   4.1 Modified Cache Replacement
5.0 Conclusion This organizational table, and the corresponding headings used in this detailed description, are provided for the convenience of reference only and are not intended to limit the scope of the present invention.

It is to be understood that while the preferred embodiment is described herein below with respect to the x86 architecture, it has general applicability to any computer architecture. Certain terminology related to 2D/3D graphics and the x86 computer architecture (such as register names, signal nomenclature, etc.) which are known to practitioners in the field of graphics and processor design, are not discussed in detail in order not to obscure the disclosure. Moreover, in order not to obscure the disclosure with structural details which will be readily apparent to those skilled in the art having the benefit of the description herein, the structure, control, and arrangement of conventional circuits have been illustrated in the drawings by readily understandable block representations showing and describing details that are pertinent to the present invention. Thus, the block diagram illustrations in the figures do not necessarily represent the physical arrangement of the exemplary system, but are primarily intended to illustrate the major structural components in a convenient functional grouping, wherein the present invention may be more readily understood.

Reference is now made to the accompanying drawings, which form a part hereof, and in which is shown by way of illustration specific embodiments in which the invention may be practiced. It is to be understood that other embodiments may be utilized and structural changes may be made without departing from the scope of the present invention.

1.0 Exemplary System

Figure 3:
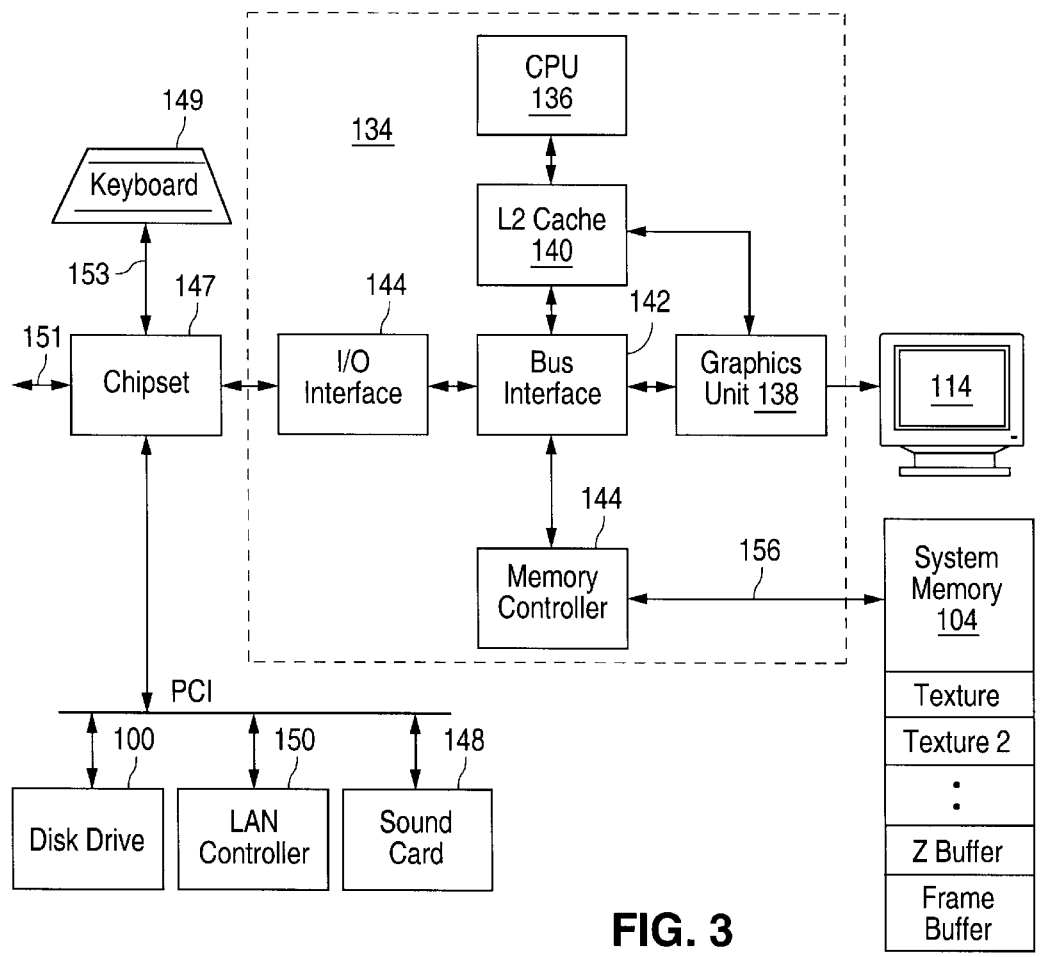
FIG. 3 is an exemplary but not limiting block diagram of a preferred multimedia processor system practiced in accordance with the principles of the present invention.

Referring to FIG. 3, an illustrative but not limiting block diagram of a multimedia processor system is depicted practiced in accordance with the principles of the present invention. A highly integrated multimedia processor 134, preferably formed on a unitary silicon die, includes a central processing unit (CPU) 136 having integer and floating point units and register files in accordance with the x86 architecture, a graphics unit 138, a shared L2 cache 140, a four port bus interface unit 142, a memory controller 144 and a I/O interface unit 146. The bus interface unit 142 couples together the CPU 136, the graphics unit 138, the L2 cache 140, the memory controller 144 and the I/O interface unit 146. The CPU 136 shares a single bus with the L2 cache 140 to the bus interface unit (BIU) 142. FIG. 3 logically depicts requests from the CPU 136 over the shared bus to the BIU 142 as passing through the shared L2 cache 140. The I/O interface unit 146 provides a fast interface between the processor 134 and a chipset bridge 147.

The chipset 147 supplies a local (e.g. PCI) bus connection for peripherals such as but not limited to, sound card 148, LAN controller 150, disk drive 100 as well as a fast serial link 151 (e.g. IEEE 1394 "firewire" bus and/or universal serial bus "USB") and a relatively slow I/O port 153 for peripherals such as keyboard and mouse 149. It should be understood that the chipset 147 may directly provide local bus functions such as but not limited to, sound, disk drive control, modem, network adapter etc. without departing from the scope of the present invention.

Memory controller 144 bridges the processor 134 to system memory 104 and may provide data compression/decompression to reduce the bandwidth of traffic crossing over memory bus 156 which preferably, although not exclusively has a RAMbus™, fast SDRAM or other type protocol. Graphics unit 138 provides TFT, DSTN, RGB or other type of video output to drive display 114.

2.0 Exemplary Central Processing Unit

The details of the exemplary CPU 136 are not necessary for the understanding of the present invention. However, a description of the exemplary CPU 136 can be found in currently available references, as will be apparent to those skilled in the art.

3.0 Exemplary Graphics Unit

Figure 4:
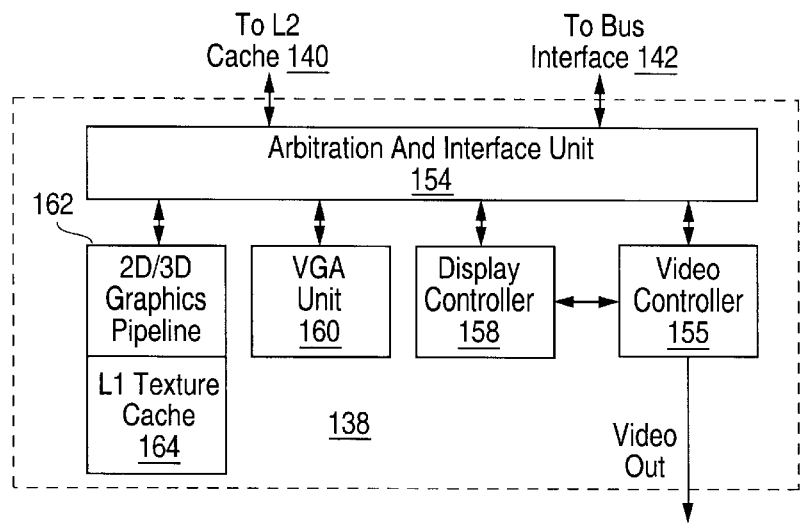
FIG. 4 is a block diagram of an exemplary but not limiting graphics unit practiced in accordance with the principles of the present invention.

Reference is now made to FIG. 4 that depicts a block diagram of an exemplary but not limiting graphics unit 138 practiced in accordance with the principles of the present invention. It is to be understood that the details of certain functional sub-units within the graphics unit 138 are not necessary for the understanding of the present invention and are only mentioned here for completeness. The graphics unit 138 includes an arbitration and interface unit 154, a video controller unit 155, a display controller unit 158, a VGA unit 160 and a 2D/3D graphics pipeline unit 162 with an L1 texture cache 164 (described in more detail herein below).

The arbitration and interface unit 154 couples the graphics unit 138 to the L2 cache 140 and to the bus interface unit 142. The arbitration and interface unit 154 arbitrates and routes read and write transactions between the L2 cache 140 and certain sub-units within the graphics unit 138 (e.g. the display controller unit 158, the VGA unit 160 and the 2D/3D graphics pipeline unit 162) and between the bus interface unit 142 and those sub-units in the graphics unit 138. The details of the exemplary arbitration and interface unit 154 are not necessary for the understanding of the present invention.

The video controller unit 155, coupled to the arbitration and interface unit 154 and the display controller unit 158, retrieves graphics and cursor/icon overlay streams from frame buffer or GART space in system memory 104, combines the cursor and the icon with the graphics stream, performs any necessary color palette lookups and generates the timing signals for the graphics stream. The resulting graphics stream is passed to the video controller unit 155 for merging with video data and for driving the display 114.

The VGA unit 160 performs functions typically associated with a VGA video compliant controller, such as, but not limited to, as described in U.S. Pat. No. 5,786,825, entitled "Virtual Display Subsystem In A Computer" to Cain et. al., issued Jul. 28, 1998, assigned to the assignee of the present invention and herein incorporated by reference.

The video controller unit 155 mixes multiple sources of video information such as an external video input (not specifically shown) with video information generated by the 2D/3D graphics pipeline unit 162 and provides a video out stream to the display 114. The video controller unit 155 maintains a line buffer in a locked down region of the L2 cache 140 (discussed in more detail herein below) to temporarily store decompressed video data for combination with frame buffer images stored in system memory 104.

The 2D/3D graphics pipeline unit 162 generates 2D and 3D graphics data and includes a dedicated setup unit (not specifically shown) along with a rasterization unit (also not specifically shown) and a first level (i.e. L1) texture cache 164 as part of a hierarchical texture cache discussed in detail herein below.

3.1 Hierarchical Texture Cache

As discussed in the Description of Related Art section above, typical graphics accelerators sometimes misdescriptively refer to a designated "swap area" in its local graphics memory as an "off chip" L2 texture cache. The local graphics memory swap area merely holds textures local to the graphics card (to avoid, among other things, slow bus transfers) and does not truly back the texture cache as would a second level in a multiple level cache. Thus prior art graphics accelerators really only have a single level texture cache. Consequently, the single level texture cache in prior art graphics controllers consume large amounts of die area since the texture cache must be multi-ported and be of sufficient size to avoid performance issues.

The present invention eliminates these drawbacks by employing a hierarchical texture cache with a small multi-ported L1 texture cache 164 local to the 2D/3D graphics pipeline unit 162 but backed by a dynamically configurable portion (e.g. a way or number of Ways) designated in the shared L2 cache 140. Textures are stored in a relatively large, single ported region of the shared L2 cache 140 (discussed herein below) that inclusively backs the small L1 texture cache 164 in the event of a miss. As discussed below, the L2 cache 140 may be used by the CPU 136 in a conventional manner while the graphics unit 138 unconventionally borrows regions from the L2 cache 140 for a number of functions including texture caching, composite buffering, z-buffering and frame buffering that in the past were provided by dedicated hardware on the graphics controller board.

Figure 5:
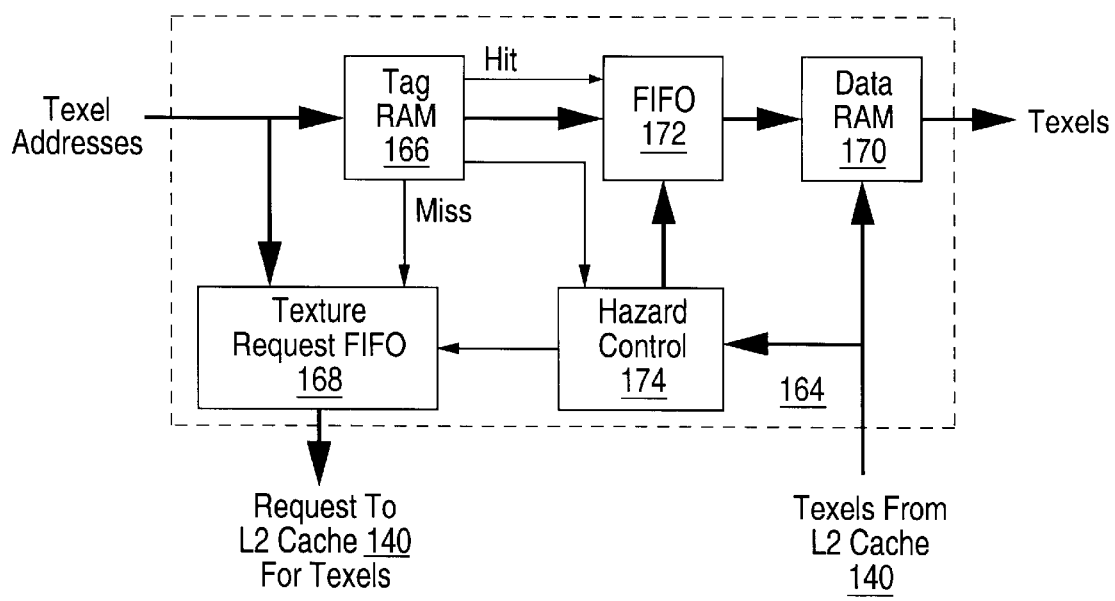
FIG. 5 is a detailed block diagram of the L1 texture cache depicted in FIG. 4.

Reference is now made to FIG. 5 that depicts a block diagram of the L1 texture cache 164 and data paths to the shared L2 cache 140 that backs it, practiced in accordance with the present invention. Texel addresses 0–3 from the texture address stage (not shown) in the 2D/3D graphics pipeline 162 are coupled to a relatively small multi-ported (e.g. 1K bytes) tag RAM 166 and to a texture request FIFO 168. The tag RAM 166 compares the texel addresses with its stored tags. When a texel address matches a stored tag (i.e. hit), the tag RAM 166 produces the location of the texel in the data RAM 170. On a miss, the texel address is fed into a texture request FIFO 168 that queues the missed texel address for a fill by the shared L2 cache 140 that backs the L1 texture cache 164. A lookahead FIFO 172 is interposed between the tag RAM 166 and the data RAM 170 to queue texels hits and mask the attendant latency of out-of-order data return from the L2 cache 140. Hazard control logic 174 coupled to the tag RAM 166, texture request FIFO 168 and lookahead FIFO 172, provides scoreboarding to allow the out-of-order data return from L2 cache 140 and to prevent textures from being de-allocated prematurely.

4.0 Shared L2 Cache Organization

Figure 6:
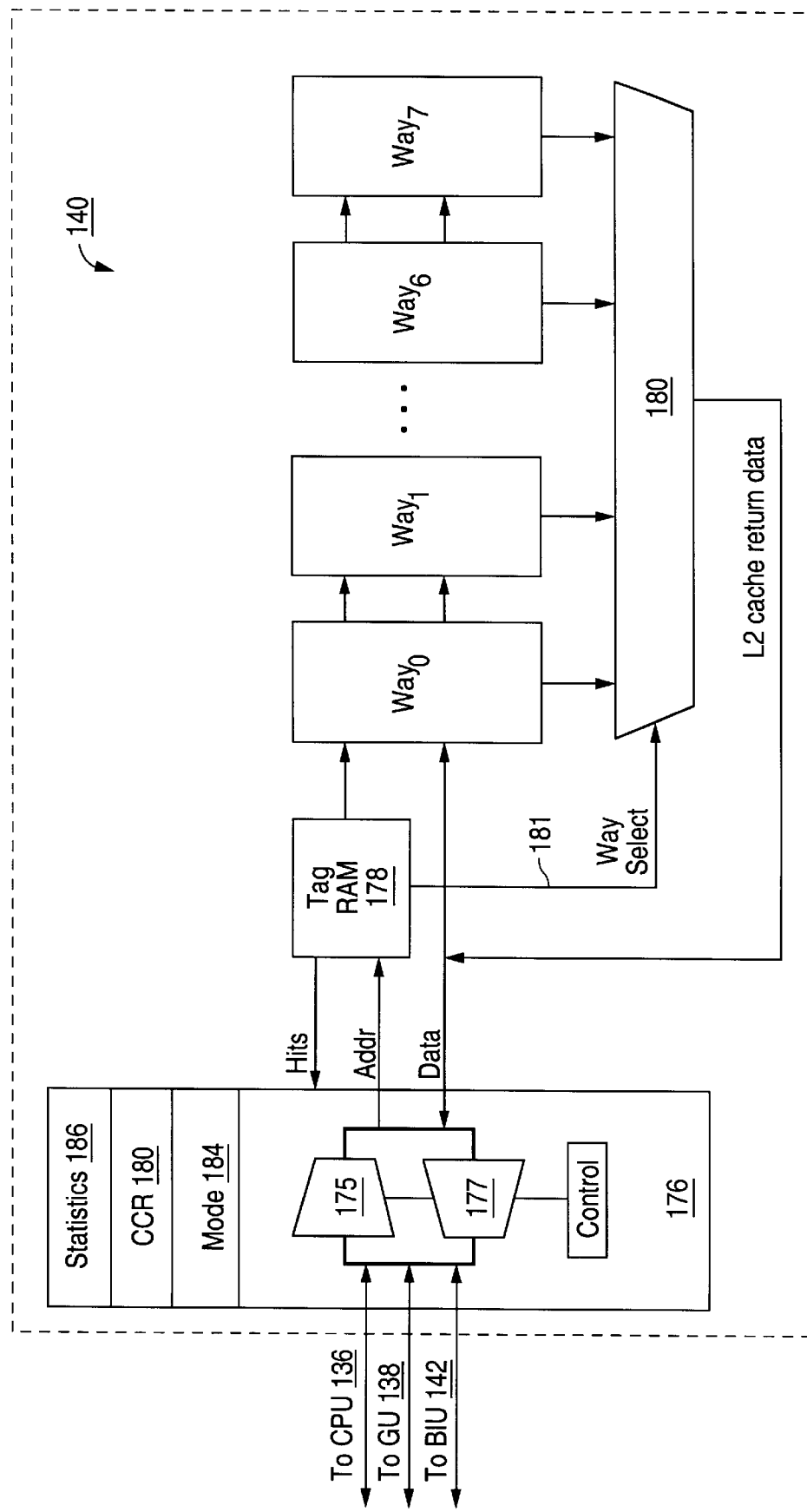
FIG. 6 is a detailed block diagram of the shared L2 cache depicted in FIG. 3; and, FIG. 7 is a flow diagram of the preferred logic to dynamically alter the cache replacement rules to avoid cache pollution in the shared L2 cache depicted in FIG. 6.

Reference is now made to FIG. 6 that depicts a detailed block diagram of the shared L2 cache 140 depicted in FIG. 3. The L2 cache 140 includes L2 controller 176 to enable shared access by the CPU 136, the graphics unit 138 and bus interface unit 142 without contention. The L2 controller 176 also provides a shared bus between the CPU 136 and the L2 cache 140 to the bus interface unit 142. Bandwidth limitations associated with accessing external memory 154 are minimized by processing shared data in the L2 cache 140 (e.g. texture, z buffer and frame buffer) between the CPU 136 and the graphics unit 138 before the shared data is written back through the bus interface unit 142 into system memory 104. L2 cache 140 fills from system memory 104 are performed through the bus interface unit 142 similarly for misses issued by either the graphics unit 138 or the CPU 136.

In the preferred embodiment, the L2 cache 140 is 256K bytes in size organized as eight way set associative (e.g. $Way_0$–$Way_7$), 8 way interleaved (e.g. $Bank_0$–$Bank_7$). Alternatively stated, the L2 cache 140 has one-thousand-twenty-four Sets, each Set having eight Ways and each Bank (e.g. $Bank_0$–$Bank_7$) containing one-hundred-twenty-eight Sets with each Set having eight Ways. $Bank_0$–$Bank_7$ data arrays (not specifically shown) are single ported but interleaved and buses are fully pipelined to provide quasi multi-port access by the CPU 136, the graphics unit 138 and the bus interface unit 142. The L2 controller 176 includes a three input multiplexer 175 and a three output selector 177 coupled to address and data buses of the CPU 136, the graphics unit 138 and the bus interface unit 142 to provide quasi multi-port access and the shared BIU 142 bus between the CPU 136 and the L2 cache 140. Since data array $Bank_0$–$Bank_7$ of the L2 cache 140 are interleaved, multiple (and possibly unrelated) transactions can occur in the L2 cache 140 concurrently. For example, the bus interface unit 142 can perform a cache fill from system memory 104 to $Bank_3$ while the graphics unit 138 reads $Bank_6$ or the L1 cache (not specifically shown) in the CPU 136 can be filled by Banks while graphics unit 138 writes to $Bank_7$.

It should be understood that the size (e.g. 1 Mbyte, 2 Mbyte, etc.), organization (e.g. fully associative through direct mapped), and basis for interleaving the L2 cache 140 (e.g. Bank or number of Banks) can be changed without departing from the scope of the present invention. Each Bank of the L2 cache 140 is preferably organized as one-hundred-twenty-eight Sets of eight cache lines each, with thirty-two bytes per cache line. Each thirty-two byte cache line has associated with it an address tag, a valid bit, and preferably four dirty bits (one for each quad-word, although one dirty bit per cache line is an alternative) in tag RAM 178 to allow for a partially dirty cache line on a quadword basis. The cache line address, which originates from selected bits in the physical address generated by either the CPU 136, GU 138 or BIU 142 is compared with the tags in tag RAM 178 for each of the eight ways. A multiplexer 180, responsive to Way select signal 181 from tag RAM 178 resulting from a match with the cache line address, a not-dirty indication, and a valid indication, steers L2 cache data from that Way onto the L2 cache return data bus on a cache read for use by either the CPU 136, GU 138 or BIU 142. A programmable no write through bit and a programmable cache disable bit in control register 180 control the L2 cache 140 mode on a page by page basis and a programmable memory configuration control field can specify certain memory regions as non-cacheable.

4.1 Modified Cache Replacement

The L2 cache 140 risks being polluted when it is shared between the CPU 136 and the graphics unit 138. Pollution is an undesirable consequence resulting from a significant quantity of graphics data (e.g. textures, z buffer data, etc.) being stored in the L2 cache 140 to a point that a significant amount of non-graphics data needed by the CPU 136 is evicted from the L2 cache 140 such that the performance of the CPU 136 is effected. To ameliorate this effect, the L2 controller 176 includes logic (e.g. circuitry or software) to dynamically alter the cache replacement rules such that the graphics unit 138 is limited as to which regions in the L2 cache 140 that it can evict data. The logic to dynamically alter the cache replacement rules does not effect cache coherency since the rule changes only apply to transactions subsequent to the change.

While many forms and combinations of cache replacement logic will be appreciated by those skilled in the art, the preferred embodiment provides Mode88 and Mode28 cache replacement methods. The so-called "Mode88" method allows either the CPU 136 or the graphics unit 138 to replace data in any of the eight Ways in the L2 cache 140 that are not locked down (described in more detail herein below). The so-called "Mode28" method permits the CPU 136 to replace data in any of the eight Ways that are not locked down while limiting the graphics unit 138 to replacement in only two of the eight Ways that are not locked down (e.g. $Way_6$ and $Way_7$). It should be also understood that while the logic in the L2 controller 176 to dynamically alter the cache replacement rules described herein has particular application to sharing a cache between the CPU 136 and the graphics unit 138, it also has application to other forms of shared caches (e.g. a unified instruction and data cache).

The L2 controller 176 includes a programmable mode register 184 to select between replacement modes Mode88 or Mode28. Monitor circuitry in the form of a statistic counter 186 is also provided by L2 controller 176 to monitor the number of hits/misses in the L2 cache 140 resulting from accesses by either the CPU 136 and/or the graphics unit 138.

Figure 7:
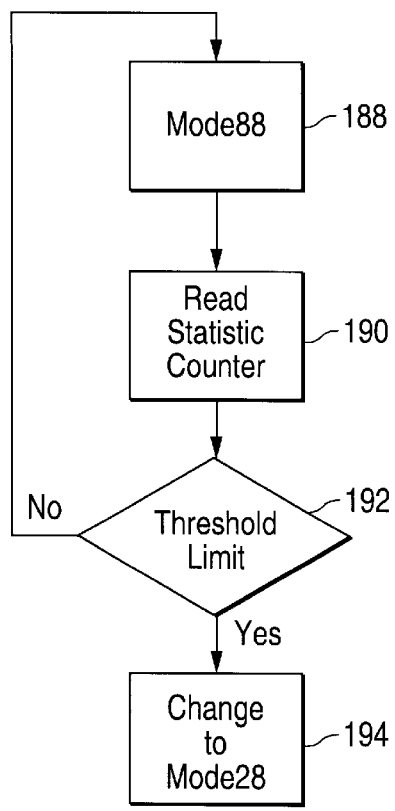

Reference is now made to FIG. 7 that depicts a flow diagram of the preferred logic to dynamically alter the cache replacement rules to avoid cache pollution in the shared L2 cache 140 depicted in FIG. 6. At step 188, Mode88 is assumed to be invoked by the contents of register 184 thus permitting either the CPU 136 or the graphics unit 138 to replace data in any of the unlocked eight Ways in the L2 cache 140. At step 190, an application program or a software driver executing under an operating system running on the CPU 136 reads the statistic counter 186. At step 192, the contents of the statistic counter 186 are compared against a predetermined threshold (fixed or settable) to determine whether the graphics unit 138 is polluting the L2 cache 140. If the threshold is exceeded, the application program or software driver writes to mode register 184 at step 194 to select Mode28 to reduce pollution by limiting the graphics unit 138 to replacement in only two of the eight Ways in the L2 cache 140. If the threshold is not exceeded, the application program or software driver does not change the mode register 184 and periodically repeats the loop of steps 188–192 at a predetermined frequency to check if pollution is occurring. It should also be understood that steps 188–194 can be performed by dedicated hardware rather than software without departing from the scope of the present invention.

The L2 controller 176 further includes circuitry to lock down the eight Ways (Way0–Way7) independent of one another on a cache line basis for either dedicated or shared use by either the CPU 136 or the graphics unit 138. In the preferred embodiment, locking cache lines in $Way_0$ is reserved for use by the CPU 136 and locking cache lines in $Way_7$ is reserved for use by the graphics unit 138. Those skilled in the art will recognize other granularities (e.g. fractional or multiple cache lines or even whole Ways) and other basis (e.g. other Way or Ways available to either the CPU 136 or the graphics unit 138) without departing from the scope of the present invention.

Locking down a Way means that the Way is never replaced regardless of the "least recently used" use indicator (i.e. LRU) of that Way, the valid bits are forced "valid" and the dirty bits are forced "not dirty" to avoid eviction from that Way. While many forms of cache locking exist, an illustrative but not limiting example suitable for adaptation for use with the present invention is described in co-pending and commonly assigned US patent application Ser. No. 08/464,921, filed Jun. 05, 1995, entitled "Cache having Spatially Defined Programmable Locked-Down Regions" which is herein incorporated by reference. Exemplary but not limiting uses for the locked down regions include storage of virtual subsystem architecture code described in co-pending and commonly assigned application Ser. No. 08/540,351 filed Oct. 06, 1995, now U.S. Pat. No. 5,938,987 entitled "Processor Architecture For Eliminating External Isochronous Subsystems" herein incorporated by reference, line buffering to hold decompressed video for further combination (e.g. filtering) with frame buffer data, and composite buffering for blending texture maps in multi-pass rendering. Other applications for the locked down regions include, but are not limited to, bump mapping, Z buffering, W buffering and 2D applications such as blit buffering.

5.0 Conclusion

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

What is claimed is:

1. A processor system comprising:
   a central processing unit;
   a graphics unit;
   a shared cache coupled to the central processing unit and the graphics unit;
   monitor circuitry to monitor hits or misses in the shared cache resulting from accesses by the graphics unit;
   cache replacement circuitry, responsive to the monitor circuitry detecting over-utilization of the shared cache by the graphics unit, to selectively limit eviction of cache segments within the shared cache for replacement with data requested by the graphics unit to selected regions of the shared cache; and
   an application program that reads a statistic counter to determine whether to program a programmable mode register to one of: (i) a mode limiting eviction of cache segments for replacement with data requested by the graphics unit to the selected regions and (ii) a mode in which eviction of cache segments for replacement with data requested by the graphics unit is not limited to the selected regions of the shared cache.

2. A processor system as recited in claim 1 wherein the shared cache is a secondary level cache.

3. A processor system as recited in claim 1 wherein the monitor circuitry is the statistic counter monitoring hits or misses in the shared cache resulting from accesses by the graphics unit in relation to hits or misses in the shared cache resulting from accesses by all units within the processor system.

4. A processor system as recited in claim 3 wherein the cache replacement circuitry includes the programmable mode register controlling whether eviction of cache segments within the shared cache for replacement with data requested by the graphics unit is limited to the selected regions.

5. A processor system as recited in claim 4 wherein a software driver the reads the statistic counter to determine whether to program the programmable mode register to one of: (i) the mode limiting eviction of cache segments for replacement with data requested by the graphics unit to the selected regions and (ii) the mode in which eviction of cache segments for replacement with data requested by the graphics unit is not limited to the selected regions of the shared cache.

6. A processor system comprising:
   a central processing unit;
   a unified cache coupled to the central processing unit;
   monitor circuitry to monitor hits or misses in the unified cache resulting from accesses by a predetermined application;
   cache replacement circuitry, responsive to the monitor circuitry detecting over-utilization of the unified cache by the predetermined application, to limit eviction of cache segments for replacement with data requested by the predetermined application to selected regions of the unified cache; and
   an application program reads the statistic counter to determine whether to program a programmable mode register to one of: (i) a mode limiting eviction of cache segments for replacement with data requested by the graphics unit to the selected regions and (ii) a mode in which eviction of cache segments for replacement with data requested by the graphics unit is not limited to the selected regions of the shared cache.

7. A processor system as recited in claim 6 wherein over-utilization of the unified cache by the predetermined application is detected based upon a number of hits in the unified cache for instructions for the central processing unit.

8. A processor system as recited in claim 6 wherein over-utilization of the unified cache by the predetermined application is detected based upon a number of hits in the unified cache for data for the central processing unit.

9. A processor system as recited in claim 6 wherein the monitor circuitry is the statistic counter.

10. A processor system as recited in claim 9 wherein the cache replacement circuitry includes the programmable mode register controlling whether eviction of cache segments within the unified cache for replacement with data requested by the predetermined application is limited to the selected regions.

11. A processor system as recited in claim 10 wherein a software driver reads the statistic counter to determine whether to program the programmable mode register to one of: (i) the mode limiting eviction of cache segments for replacement with data requested by the graphics unit to the selected regions and (ii) the mode in which eviction of cache segments for replacement with data requested by the graphics unit is not limited to the selected regions of the shared cache.

12. A processor system comprising:
    a central processing unit;
    a graphics unit;
    a shared cache coupled to the central processing unit and the graphics unit;
    monitor circuitry to monitor hits or misses in the shared cache resulting from accesses by the graphics unit;
    cache replacement circuitry, responsive to the monitor circuitry detecting over-utilization of the shared cache by the graphics unit, to selectively limit eviction of cache segments within the shared cache for replacement with data requested by the graphics unit to selected regions of the shared cache; and
    a software driver that reads a statistic counter to determine whether to program a programmable mode register to one of (i) a mode limiting eviction of cache segments for replacement with data requested by the graphics unit to the selected regions and (ii) a mode in which eviction of cache segments for replacement with data requested by the graphics unit is not limited to the selected regions of the shared cache.

13. A processor system as recited in claim 12 wherein the shared cache is a secondary level cache.

14. A processor system as recited in claim 12 wherein the monitor circuitry is a statistic counter monitoring hits or misses in the shared cache resulting from accesses by the graphics unit in relation to hits or misses in the shared cache resulting from accesses by all units within the processor system.

15. A processor system as recited in claim 14 wherein the cache replacement circuitry includes a programmable mode register controlling whether eviction of cache segments within the shared cache for replacement with data requested by the graphics unit is limited to the selected regions.

16. A processor system as recited in claim 15 wherein an application program reads the statistic counter to determine whether to program the programmable mode register to one of (i) the mode limiting eviction of cache segments for replacement with data requested by the graphics unit to the selected regions and (ii) the mode in which eviction of cache segments for replacement with data requested by the graphics unit is not limited to the selected regions of the shared cache.

17. A processor system comprising:
   a central processing unit;
   a unified cache coupled to the central processing unit;
   monitor circuitry to monitor hits or misses in the unified cache resulting from accesses by a predetermined application;
   cache replacement circuitry, responsive to the monitor circuitry detecting over-utilization of the unified cache by the predetermined application, to limit eviction of cache segments for replacement with data requested by the predetermined application to selected regions of the unified cache; and
   a software driver reads the statistic counter to determine whether to program a programmable mode register to one of: (i) a mode limiting eviction of cache segments for replacement with data requested by the graphics unit to the selected regions and (ii) a mode in which eviction of cache segments for replacement with data requested by the graphics unit is not limited to the selected regions of the shared cache.

18. A processor system as recited in claim 17 wherein over-utilization of the unified cache by the predetermined application is detected based upon a number of hits in the unified cache for instructions for the central processing unit.

19. A processor system as recited in claim 17 wherein over-utilization of the unified cache by the predetermined application is detected based upon a number of hits in the unified cache for data for the central processing unit.

20. A processor system as recited in claim 17 wherein the monitor circuitry is the statistic counter.

21. A processor system as recited in claim 20 wherein the cache replacement circuitry includes the programmable mode register controlling whether eviction of cache segments within the unified cache for replacement with data requested by the predetermined application is limited to the selected regions.

22. A processor system as recited in claim 21 wherein an application program reads the statistic counter to determine whether to program the programmable mode register to one of: (i) the mode limiting eviction of cache segments for replacement with data requested by the graphics units to the selected regions and (ii) the mode in which eviction of cache segments for replacement with data requested by the graphics unit is not limited to the selected regions of the shared cache.

23. A method of dynamically altering cache replacement rules in a processor system having a unified cache comprising the steps of:
   (a) monitoring hits or misses in the unified cache resulting from accesses by a predetermined application to identify over-utilization of the unified cache by the predetermined application; and
   b) responsive to detecting over-utilization of the unified cache by the predetermined application in step (a), limiting eviction of cache segments within the unified cache for replacement with data requested by the predetermined application to selected regions in the unified cache, and not limiting eviction of cache segments within the shared cache for replacement with data requested by the processor.

24. The method recited in claim 23, wherein the predetermined application is a graphics unit storing texture maps in the unified cache.

25. The method recited in claim 23 wherein the unified cache is a secondary level cache.

26. The method as recited in claim 23, further comprising the step of limiting eviction of cache segments within the shared cache for replacement with data requested by the predetermined application to a number of ways within the shared cache.

27. The method as recited in claim 26, further comprising the step of limiting eviction of cache segments within the shared cache for replacement with data requested by the predetermined application to two of eight ways within the shared cache.

28. The method as recited in claim 26, further comprising the step of releasing, in response to detecting under-utilization of the shared cache by the predetermined application, the limitation of eviction of cache segments within the shared cache for replacement with data requested by the predetermined application to the selected regions.

29. A method of dynamically altering cache replacement rules in a processor system having a unified cache comprising the steps of:
   (a) monitoring hits or misses in the unified cache resulting from accesses by a predetermined application to identify over-utilization of the unified cache by the predetermined application; and
   (b) limiting, in response to detecting over-utilization of the unified cache by the predetermined application in step (a), eviction of cache segments within the unified cache for replacement with data requested by the predetermined application to selected regions in the unified cache, and releasing, in response to detecting under-utilization of the predetermined application in step (a), the limitation of eviction of cache segments within the shared cache for replacement with data requested by the predetermined application to the selected regions.

30. The method recited in claim 29 wherein the predetermined application is a graphics unit storing texture maps in the unified cache.

31. The method recited in claim 29 wherein the unified cache is a secondary level cache.

32. The method recited in claim 29, in limiting eviction of cache segments within the shared cache for replacement with data requested by the predetermined application to selected regions of the shared cache, further comprising the step of not limiting eviction of cache segments within the shared cache for replacement with data requested by the processor.

33. The method recited in claim 29, further comprising the step of limiting eviction of cache segments within the shared cache for replacement with data requested by the predetermined application to a number of ways within the shared cache.

34. The method recited in claim 33, further comprising the step of limiting eviction of cache segments within the shared cache for replacement with data requested by the predetermined application to two of eight ways within the shared cache.

* * * * *